INVENTORS
HENRY J. BRETTRAGER
*HAL B. REEVE*
BY *ELMER A. RADER*

ATTORNEYS

INVENTORS
HENRY J. BRETTRAGER
HAL B. REEVE
BY ELMER A. RADER

ATTORNEYS

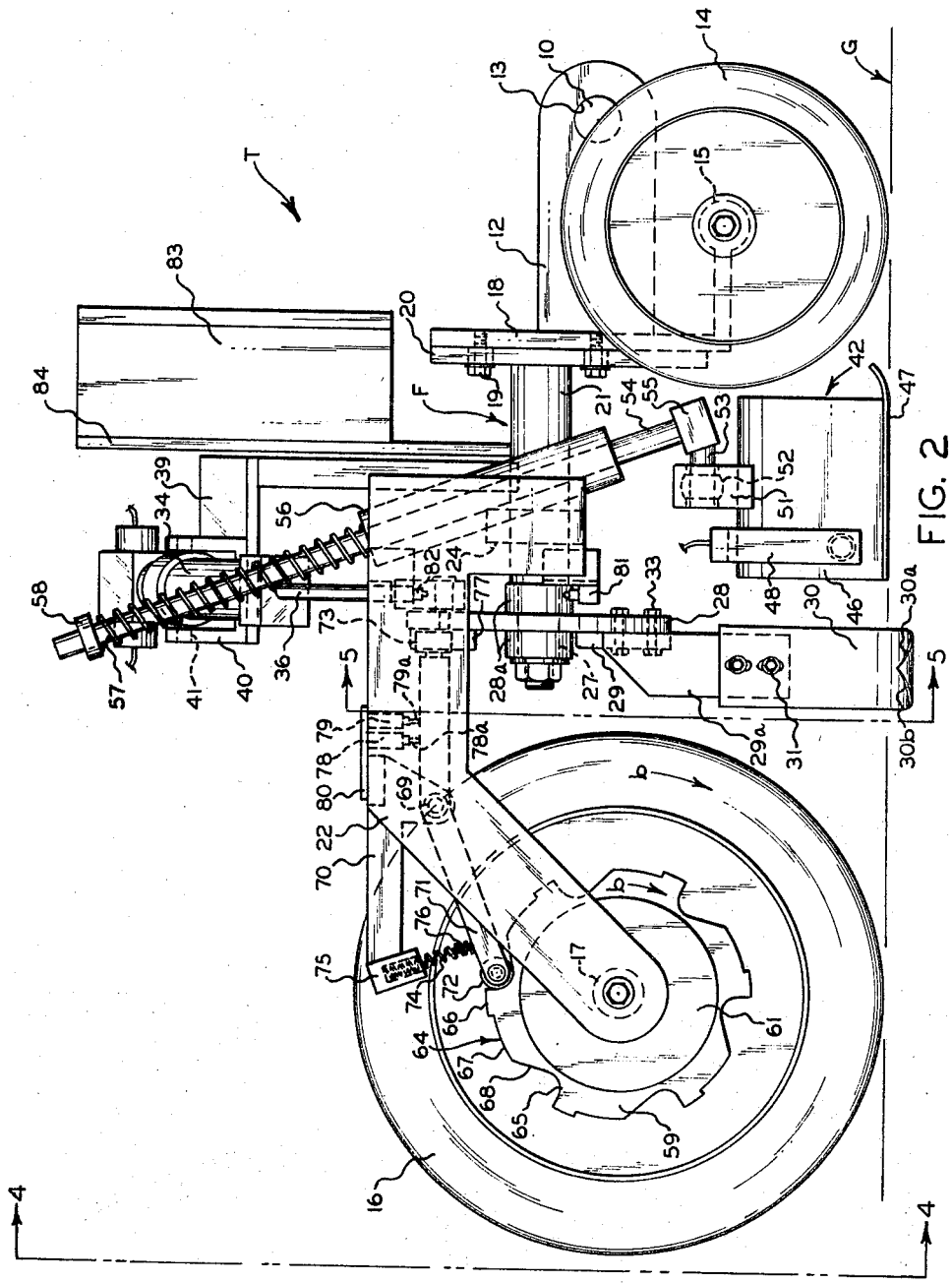

United States Patent Office 3,425,495
Patented Feb. 4, 1969

3,425,495
METHODS FOR THINNING ROW CROPS
Hal B. Reeve, 1839 Arthur St. 48602; Henry J. Brettrager, 5410 East St. 48601; and Elmer A. Rader, 2003 Arthur St. 48602, all of Saginaw, Mich.
Filed Sept. 15, 1965, Ser. No. 487,380
U.S. Cl. 172—1     13 Claims
Int. Cl. A01b 79/00, 41/06

This invention relates to methods and machines for thinning out rows of plants such as sugar beets, cotton, and various vegetables, and more particularly to a relatively simple and compact machine of this character which is highly reliable in operation and can be manufactured most economically. One of the prime objects of the invention is to design a thinning machine which adapts to the spaced condition of the growing crops in situations in which the desired distance between some of the plants is exceeded in the row while providing the desired minimum distance between other plants which are unduly crowded.

Another object of the invention is to provide a thinning machine which does not disturb weed killer and fertilizer, which have been previously deposited in the ground, by flailing the ground and chopping out the plants.

Still another object of the invention is to provide a thinning machine which compensates for the contour of the ground so that its operation is not deleteriously affected by uneven ground conditions in the fields.

Another object of the invention is to provide a method of thinning row crops wherein a plant which is to be spared is sensed and all plants within a designated distance of the plant in the direction of travel of the machine are destroyed regardless of the speed of travel down the row. Briefly, in the operation of the machine to be described a severing knife is withdrawn from the ground when a plant is sensed and a cycle is initiated in accordance with the ground speed of the machine wherein the severing knife re-enters the ground after a short interval sufficient to permit the knife to advance beyond and spare the plant and remains in the ground until it has advanced at least a designated distance. Thereafter, the knife continues in the ground until another plant beyond this designated distance is sensed.

Other objects and advantages of the invention will be pointed out specifically or will become apparent from the following description when it is considered in conjunction with the appended claims and the accompanying drawings, in which:

FIGURE 2 is a considerably enlarged side elevational view of the machine only;

Figure 1:
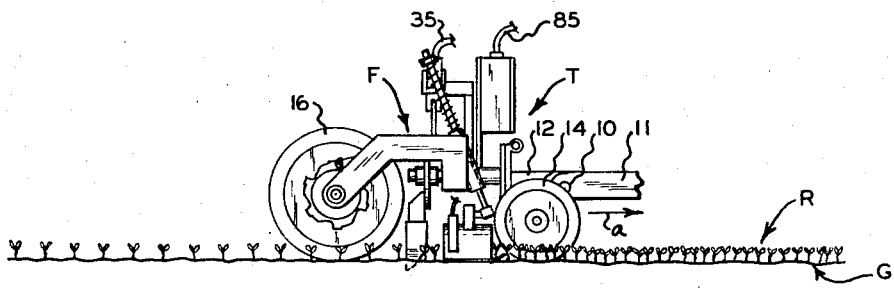
FIGURE 1 is a side elevational view of a thinning machine being drawn along a row of plants.

Referring now more particularly to the accompanying drawings and, in the first instance, to FIGURE 1, a row of crops, generally designated R, is shown growing in the ground G and the thinning machine, which is generally designated T, is illustrated as moving along the row of plants R in the direction of the arrow a. The machine T includes frame means generally designated F which may be pivotaly connected as at 10 to a tractor draw bar 11, the frame means F including a coupling bar 12 having an opening 13 through which the connecting pin 10 is inserted. While it is thought that the device can be more economically manufactured as an attachment which is to be drawn behind a tractor or other prime mover having a compressed air source and an electric power source, it is to be understood that the thinning machine could incorporate a self-propelling engine and steering apparatus.

To support the thinning machine for travel along the ground, a pair of front wheels 14 are provided on a front axle 15, the wheels 14 being trailed by a rear wheel 16 of somewhat larger diameter mounted on a rear axle 17. It will be noted that the wheels 14 are spaced sufficiently apart so that they may proceed down a row of growing crops, with a wheel 14 on either side of the row, and that the rear wheel 16 is in longitudinal alignment with one of the wheels 14 so that it too travels along the side of the row. The front axle 15 supports the plate 18 to which the coupling bar 12 is attached, the frame plate 18 being connected by bolts 19 to a frame plate 20 from which extends a longitudinally disposed cylindrical frame portion 21. The frame F is also supported by the rear wheel 16 by virtue of a bifurcated frame assembly having sides 22 and 23 connected by a cross bar 24 which receives and is rigidly secured to the frame portion 21. It will be seen that braces 25 and 24 bridge the sides 22 and 23, which have openings to pass the ends of the axle 17.

Formed on the rear end of the frame portion 21 is a trunnion pin 27 on which a rotary disk 28 having hub portions 28a is mounted for rotational movement. A bracket 29 is secured to the rear face of the disk 28 and has a dependent leg 29a to which a generally C-shaped severing blade 30 is secured, as with bolts 31. So that the position of the blade or knife 30 may be adjusted, arcuate slots 32 are provided in the disk 28, and bolt and nut assemblies 33 extending through the bracket 29 are secured in the portions of the slots 32 which provide the desired lateral and vertical position of the knife 30. By adjusting the position of the bracket 29 within the limits of slots 32, the depth that the knife travels beneath the surface of the ground when it is in lowered position may be carefully set for the particular plants being thinner.

Figures 5, 6:
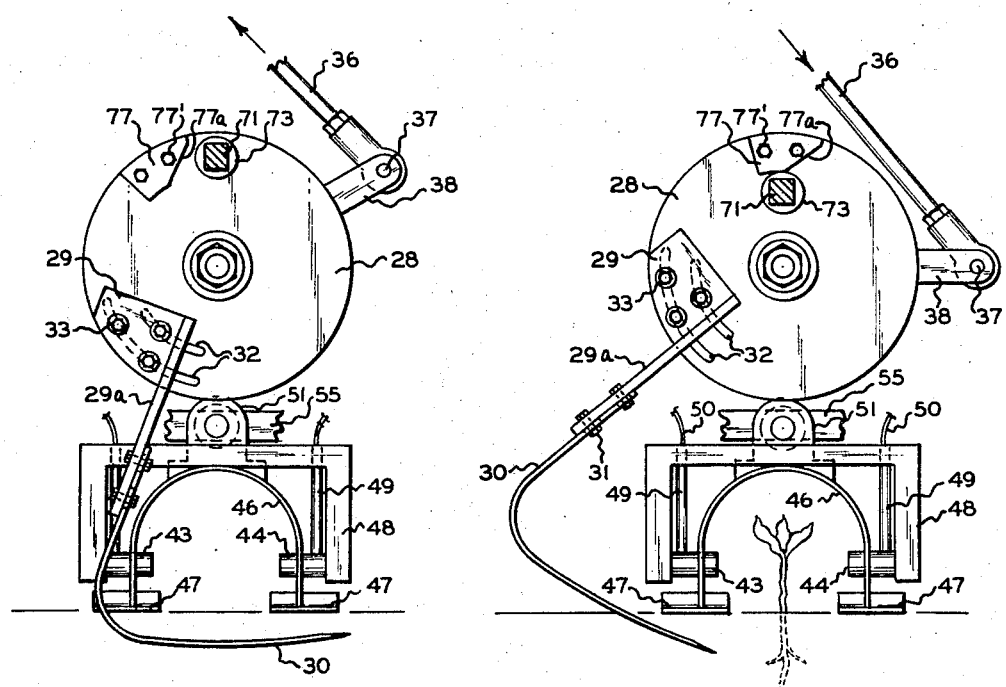
FIGURE 5 is a transverse sectional view of some of the elements only, taken on the line 5—5 of FIGURE 2, the view showing the severing knife in lowered position.
FIGURE 6 is a view similar to FIGURE 5 but showing the severing knife proceeding toward a raised position.

Both the leading and trailing edges 30a and 30b, respectively, of the knife blade 30 are sharpened and converge to a point so that the blade is easily moved in the ground from the position in which it is shown in FIGURE 6 to the position in which it is shown in FIGURE 5, for instance. Because the leading edge 30a of the blade is tapered in a direction away from the path of travel of the machine, there is relatively little danger of the knife severing a plant which it is desired to spare, even though the machine and knife are moving forwardly toward the plant as the knife is being retracted as shown in FIGURE 6. Also, because the edge 30b of the knife is also tapered, the possibility of cutting a plant it is desired to spare, on reinsertion of the knife, is also minimized.

The disk 28 is revolved through part of a revolution by a double-acting pneumatic cylinder 34 of conventional character having electrically operated advance and retract solenoids in the usual manner, and the cylinder is preferably serviced with air from a flexible compressed air line 35 (see FIGURE 1) leading to a compressor and accumulator tank mounted on the tractor unit. The advance and retract solenoids control valves which admit air to the upper end of the cylinder 34 and exhaust it from the lower end thereof to atmosphere to move the disk 28 slightly beyond the position in which it is shown in FIGURE 6, and admit air to the lower end of cylinder 34 and exhaust it from the upper end thereof to pivot the disk 28 to the position in which it is shown in FIGURE 5. The piston rod 36 of cylinder 34 is pivotally connected, as at 37, to an ear 38 provided on the disk 28, as shown particularly in FIGURES 5 and 6, and a bracket 39 fixed to the frame portion 21 mounts a clevis 40 which pivotally supports the air cylinder 34 by means of trunnion pins 41.

Mounted forwardly of the knife blade 30 is a plant sensing assembly generally designated 42 (see FIGURES 2, 4, 5 and 6) which includes a pair of conventional electric eye lamp and cell elements 43 and 44, the lamp element generating a light beam 45 which is interrupted momentarily when the elements 43 and 44 are laterally opposite a plant. The elements 43 and 44 are carried on an inversely disposed, U-shaped sled 46 having ground engaging shoes 47 at its lower ends adapted to move along the surface of the ground or along the sides of the row of plants, the elements 43 and 44, which are connected by a bracket 48, extending through the sides of the sled 46 as shown in FIGURE 6. Tubes 49 are carried by the member 48 to house the wires 50 which connect to the electrical circuit which will be presently described. Mounted on top of the sled 46 is a spherical bearing 51 which receives a ball joint 52 on an arm 53 connected with vertically extending rods 54, the rods 54 on opposite sides of the thinning machine being connected to the arm 53 by a cross bar 55. Each of the rods 54 passes through a sleeve 56 secured to the frame means F, and a coil spring 57 is mounted on the one rod 54 between the sleeve 56 and a collar 58 thereon to counterbalance the sled element 46 so that it does not dig into loose soil. As is now apparent, the sled 46 is mounted for universal pivoting movement on the joint 52 and thus can adapt to the contour of the ground.

The plants left in the row by the thinning machine should be spaced a certain minimum distance apart. For instance, in the case of sugar beets this minimum distance may be eight inches. It may be, however, that some plants in the row are already more than eight inches apart and it is necessary that the machine compensate for this. In the machine illustrated a cam disk 59 is rotatably mounted on a hub 60 which is secured to the wheel 16 to rotate with it, the cam 59 being sandwiched between a plate 61 secured rigidly to the hub or tubular stub shaft 60 and a clutch plate 62 which is slideable axially on the hub 60 and is pressed into frictional engagement with the cam disk 59 by springs 63. Thus, under normal conditions and unless prevented from doing so, the pressure of the clutch plate 62 on the cam wheel 59 will normally cause the cam wheel 59 to rotate with the hub 60 and wheel 16. Provided on the cam wheel 59 are land portions generally designated 64 which are separated by notches 65. As will be seen from an examination of FIGURE 2, the land portions 64 include high rise portions 66, low rise portions 67, and sloping surfaces 68 leading to each notch 65. The lands 64 are of such relative equal length that the peripheral distance between notches 65 corresponds to the minimum spacing desired between the plants in the row.

Pivotally mounted as at 69 on a bracket 70 supported longitudinally centrally on the brace 25 is a lever 71 having a pivotally mounted follower roller 72 at its rear end longitudinally aligned to ride on the cam wheel 59 and engage within its notches 65. At its opposite end the lever 71 mounts a follower roller 73. A spring 74 disposed in a spring cup 75 mounted on the support 70 and received by a pin 76 on the lever 71 normally forces the lever 71 downwardly and maintains it in engagement with the cam wheel 59.

As shown more particularly in FIGURES 2, 4, 5 and 6, a cam block 77 is bolted as at 77' to the knife disk 28. When the disk 28 is pivoted clockwise in FIGURE 5 to raise the knife 30, the cam 77 is brought around to engage the roller 73 and displace it downwardly, thereby causing the roller 72 to be lifted clear of one of the notches 65 so that the cam wheel 59 can rotate in the direction $b$ with the wheel 16. The lever 71 is utilized to actuate conventional microswitches 78 and 79 which depend from a plate 80 secured to the base 25. In addition, a microswitch 81 is fixed on the side plate 22 in position to be actuated by the end of piston rod 36 when the knife 30 is moved to the position in which it is shown in FIGURE 6 and a microswitch 82 is mounted on side plate 22 in position to be actuated by the end of rod 36 when the knife disk 28 is swung counterclockwise to the position in which it is shown in FIGURE 5.

The control box for housing the various electrical circuit elements is shown at 83 supported on a post 84 and, as shown in FIGURE 1, a flexible electrical power conduit 85 leads from the tractor battery to the box 84. Alternatively, the control box 83 could, of course, carry its own battery.

Figure 7:
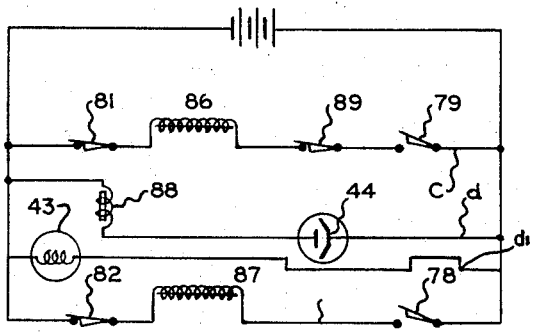
FIGURE 7 is a schematic view illustrating a typical electrical control circuit for the machine.
Figure 3:
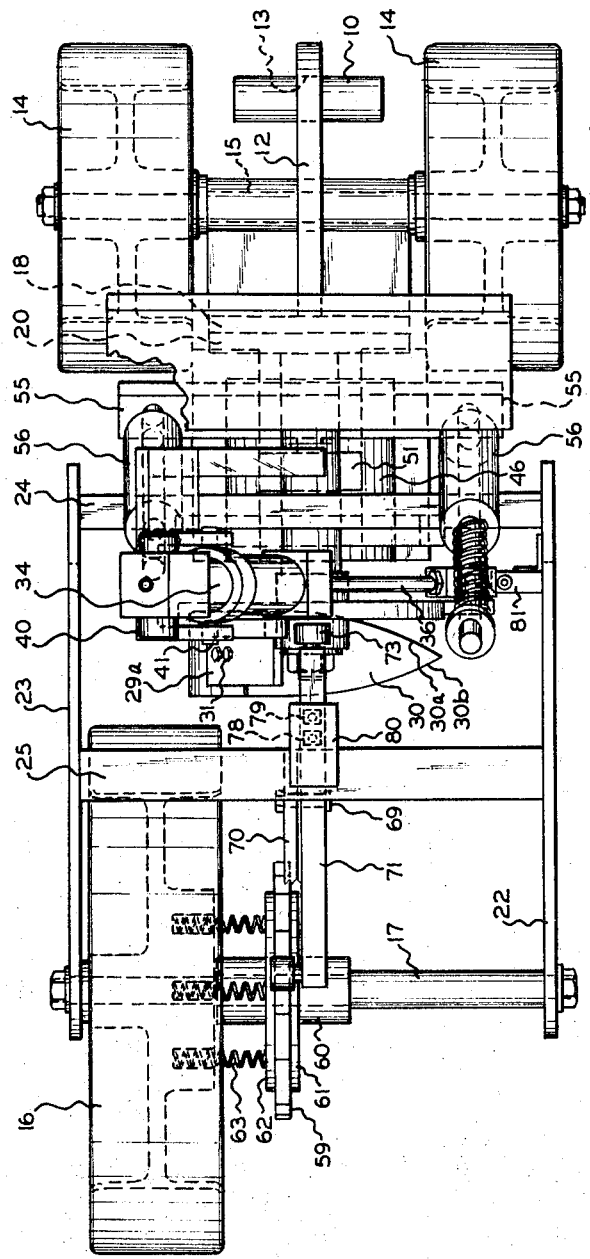
FIGURE 3 is a top plan view of the machine shown in FIGURE 2.
Figure 4:
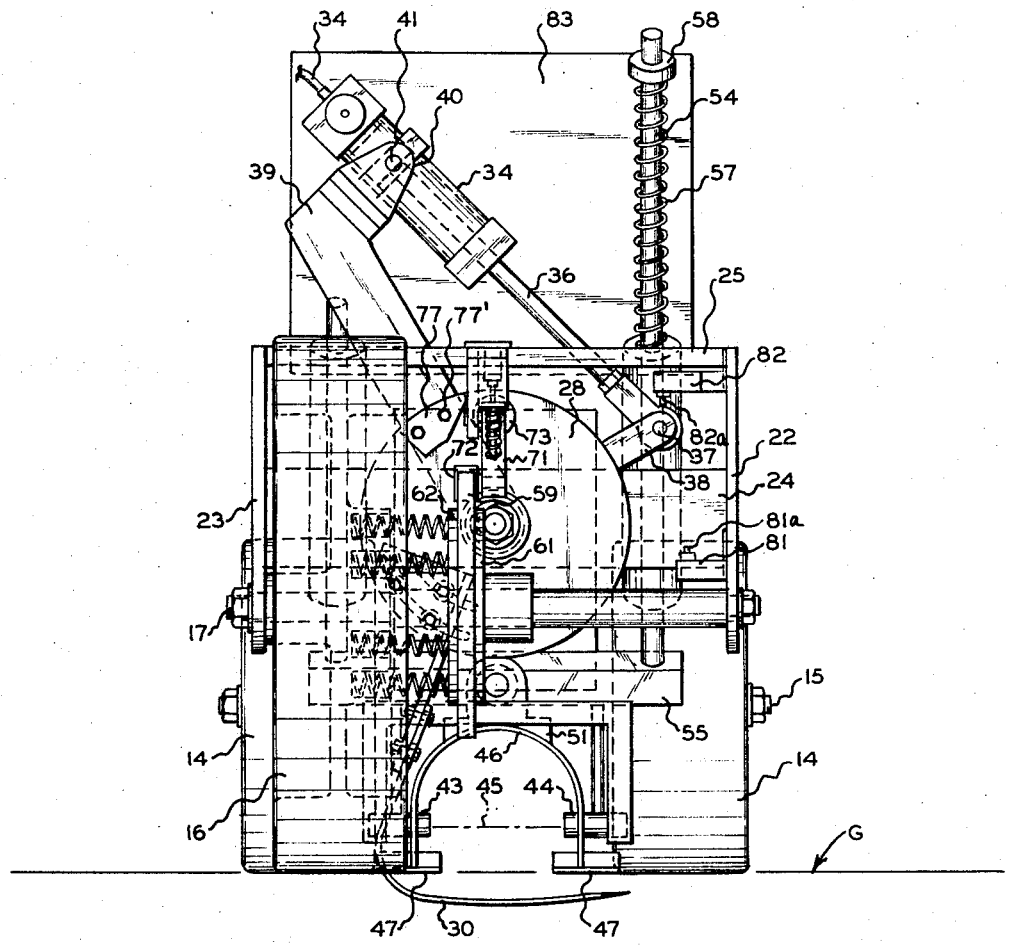
FIGURE 4 is a rear elevational view taken on the line 4—4 of FIGURE 2.

In FIGURE 7 we have shown a typical electrical circuit in which the advance or blade raising solenoid 86 of the power cylinder 34 is connected in a circuit line $c$ and the retract or blade lowering solenoid 87 of the air cylinder 34 is connected in a circuit line $e$. The photo cell 44 is connected in a circuit line $d$ with a relay 88 which, when energized, maintains a normally closed switch 89 in circuit line $c$ open. The lamp 43 furnishing the beam which plays upon the photocell is in a circuit line $d1$. Also provided in the circuit line $c$ in series with the other elements is the normally open switch 79, which is closed when the roller 72 is in one of the notches 65 and the lever 71 is in engagement with the depressable plunger 79$a$ of the switch 79. The switch 81, which is also connected in circuit line $c$, is a normally closed switch which opens only when its depressable plunger 81$a$ is displaced by the piston 36. Provided in circuit line $e$ is the normally open limit switch 78, which is closed when the roller 72 drops from the surface 66 to the surface 67 to release depressable plunger 78$a$ and energize the solenoid 87 to retract the poston rod 36 and lower knife 30. Also provided in the circuit line $e$ is a normally closed switch 82 which is opened when its depressable plunger 82$a$ is engaged by the piston rod 36 shown in FIGURE 4.

In operation the thinning machine is drawn slowly along one of the rows R at a speed in the neighborhood of two to thre miles per hour. To begin with, the knife 30 is disposed in the ground in the position indicated in FIGURE 5 and the roller 72 is disposed in one of the notches 65 in the manner illustrated in FIGURE 2. When the electric eye beam 45 is interrupted by a first plant, the relay 88 is deenergized and switch 89 is permitted to close so that a cycle is initiated and advance solenoid 86 is energized and the knife 30 is withdrawn slightly beyond the position in which it is shown in FIGURE 6. When the disk 28 nears the end of its travel, the cam 77 displaces the roller 73 downwardly and accordingly lifts the roller 72 clear of the notch 65 in which it has been engaged, so that the cam disk 59 is now free to travel with the wheel 16 under the pressure of the clutch springs 63. At the same time, the plunger 79$a$ of limit switch 79 is released and switch 79 in circuit line $c$ opens to deenergize the advance solenoid 86 even though the beam 45 has now passed beyond the plant sensed. The depressable plunger 78$a$ of switch 78 is also fully extended at this time, but as the high rise portion 66 of the cam 59 passes beyond the roller 72 and the roller 72 drops to the lower rise portion 67 the front portion of the lever 71 is raised sufficiently to depress the plunger 78$a$ and close the limit switch 78. It will be noted that the cam block 77 includes a sloped portion 77$a$ which the roller 73 engages when the advance solenoid has been fully actuated and which permits the front end of lever 71 to rise the required distance to close switch 78. With this the retract solenoid 87 of the air cylinder 34 is energized and the knife 30 is pivoted downwardly to the position in which it is shown in FIGURE 5, the time interval created by the high rise portion 66 being sufficient so that the knife 30, which has been advancing with the machine, re-enters the ground just forwardly of the plant which has been sensed and is to be spared. Thereafter, while the portions 67 and 68 of the cam move past the roller 72, the knife 30 remains in the ground and the tap roots of all plants are cut. When the roller 72 drops into the next notch 65, the cycle has been completed and the required distance forwardly of the plant which was sensed has been cleared. With the dropping of the roller 72 into the notch, the normally open switch 79 is closed by the front end of lever 71 so that the eye circuit may again be energized. If no plant P is immediately in position to break the beam 45 and restart the cycle, the knife 30 simply remains in the ground. Thus, it will be seen that the initiation of the cycle depends on the presence of a plant, and that the machine adapts itself to the spaced condition of the plants in the row.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

We claim:

1. A method of thinning growing plants planted in rows to provide a predetermined spacing between the plants in a row comprising: moving a cutter along a row of plants which are not in a constant line of the length of said spacing with the cutter disposed in the ground in position to sever the roots of plants encountered simultaneously moving along the row; a sensing means connected to raise the cutter upon sensing the presence of a plant; sensing the presence of a plant immediately ahead of the cutter and automatically raising the cutter to spare a first plant; holding the cutter in raised position for a predetermined time gauged by the speed of the cutter along the row for a sufficient time to spare the said first plant; preventing the sensing means from raising the cutter for a predetermined time gauged solely by the speed of the cutter along the row; lowering the cutter into the ground and holding it there for a predetermined time to sever the roots of all plants encountered as the cutter proceeds forwardly a designated distance and while the sensing means is prevented from raising the cutter; and then, after the cutter has moved a predetermined distance forwardly in the ground, reactivating the sensing means so that it can raise the cutter when another plant at least the designated minimum distance ahead of the said first plant is sensed.

2. A method of thinning growing plants planted in rows comprising: moving plant disabling means and sensing means operative to sense the presence of a plant and connected to the plant disabling means to deactivate the plant disabling means along a row of plants in the ground; sensing the presence of a plant ahead of the plant disabling means and deactivating the plant disabling means to spare the said plant; disconnecting the sensing means from the plant disabling means for a predetermined time gauged by the speed of the cutter along the row to deactivate the sensing means; reactivating the plant disabling means; and after the plant disabling means has been reactivated and moved a designated distance forwardly reactivating the sensing means.

3. Apparatus for thinning growing plants planted in a row less than a predesignated distance apart comprising: frame means adapted to be moved longitudinally along a row; laterally extending severing means thereon mounted for swinging movements from a lowered position in longitudinal alignment with plants in the row to a raised position laterally removed therefrom; laterally spaced electric eye means, in an eye circuit and carried by said frame means, forming a laterally extending beam in position to be interrupted by plants in its path; power means operated by said electric eye means when the beam is interrupted for raising said severing means when a first plant interrupts the beam; wheel means on said frame means for engaging the ground and being revolved as the frame means moves along the row; rotary cam means normally revolvable with said wheel means but slippable relative thereto; spring means normally urging said cam means to revolve with said wheel; said cam means having land portions of an equal peripheral length corresponding substantially to said distance and separated by notches; pivotal longitudinally extending lever means having a first follower at one end riding on said cam means and, when received in one of said notches, preventing rotation of said cam means with said wheel; said lever means being intermediately pivoted and having a second follower at the other end engaged by said severing means and raised thereby when the severing means is brought to raised position, said engagement pivoting said lever means to raise said follower out of one of said notches to release said cam means; spring means normally urging said first follower downwardly; surfaces of recessed level on said lands remote from said notches in the direction of travel of said wheel and rotary cam means; first switch means operated by said lever means when the first follower drops into the said surfaces of recessed level, after a predetermined travel of said first rollers on said lands during which a first plant is spared, connected to cause said power operated means to lower said severing means; second switch means, operative to open said eye circuit while said first follower is riding on a land; and third switch means operative to close said eye circuit after a predetermined time when said wheel has moved forwardly and said severing means has severed all plants in its path for said designated distance so that the next successive plant following said designated distance is sensed by said eye means and spared.

4. The combination defined in claim 3 in which said electric eye means are carried on a shoe traveling along the ground; and means mounting said shoe on said frame means for tilting movement in accordance with the contour of the ground.

5. Apparatus for thinning growing plants planted in a row less than a predesignated distance apart comprising: frame means adapted to be moved longitudinally in a path along a row; laterally extending severing means thereon mounted for swinging movements from a lowered position in longitudinally alignment with plants in the row to a raised position laterally removed therefrom; laterally spaced electric eye means, in an eye circuit and carried by said frame means, forming a laterally extending beam in position to be interrupted by a first plant in said path; power means operated by said electric eye means when the beam is broken for raising said severing means; wheel means on said frame means for engaging the ground and being revolved as the frame means moves along the row; rotary cam means normally revolvable with said wheel means but slippable relative thereto; means normally urging said cam means to revolve with said wheel; said cam means having land portions of an equal peripheral length corresponding substantially to said distance and separated by notches; control means, when received in one of said notches, preventing rotation of said cam means with said wheel; means for raising said control means out of a notch when the severing means is brought to raised position and releasing said rotary cam means to revolve with said wheel; means connected to lower said severing means after a time when it has cleared said first plant; and means deactivating said eye circuit while said control means is out of a notch and reactivating said eye circuit after a predetermined time when said wheel has moved forwardly and said severing means has severed all plants in its path for said designated distance so that the next successive plant following said designated distance is sensed by said eye means and spared.

6. Apparatus for thinning growing plants planted in a row less than a predesignated distance apart comprising: frame means adapted to be moved longitudinally in a path along a row; plant disabling means thereon; sensing means carried by said frame means in position to be activated by a first plant in said path; means operated by said sensing means for deactivating said plant disabling means; wheel means on said frame means for engaging the ground and being revolved as the frame means moves along the row; rotary cam means normally revolvable with wheel means but slippable relative thereto; means normally urging said cam means to revolve with said wheel; said cam means having land portions separated by notches; control means, when received in one of said notches, preventing rotation of said cam means with said wheel; means for raising said control means out of a notch when the sensing means is activated and releasing said rotary cam means to revolve with said wheel; means connected to reactivate said plant disabling means after a time when it has cleared said first plant; and means deactivating said sensing means while said control means is out of a notch and reactivating it when said control means is again received in a notch.

7. Apparatus for thinning growing plants planted in a row less than a predesignated distance apart comprising: frame means adapted to be moved longitudinally in a path along a row; laterally extending severing means thereon mounted for swinging movements from a lowered position in the ground in longitudinal alignment with plants in the row to a raised position laterally removed therefrom; sensing means, carried by said frame means in position to be activated by a first plant in said path; means connected to and operated by said sensing means for raising said severing means when said first plant is sensed; means connected to lower said severing means after a time when it has cleared said first plant; and means disconnecting said sensing means from said means for raising said severing means and reconnecting it after a predetermined time gauged solely by the speed of the cutter along the row when said severing means has severed all plants in its path for said designated distance so that the next successive plant following said designated distance is sensed and spared.

8. Apparatus for thinning growing plants planted in a row less than a predesignated distance apart comprising: frame means adapted to be moved longitudinally in a path along a row; plant disabling means thereon including means mounted for movement to a position deactivating said plant disabling means; sensing means, carried by said frame means in position to be activated by a first plant in said path; means connected to and operated by said sensing means for operating said means movable to a position to deactivate said plant disabling means when said first plant is sensed; means permitting reactivation of said plant disabling means after a time when it has cleared said first plant; and means disconnecting said sensing means from said means to which it is connected and reconnecting it after a predetermined time gauged solely by the speed of the cutter along the row when said disabling means has disabled all plants in its path for said designated distance so that the next successive plant following said designated distance is sensed and spared.

9. Apparatus for thinning growing plants planted in a row less than a predesignated distance apart comprising: frame means adapted to be moved longitudinally in a path along a row; plant destroying means thereon; operating means for rendering said plant destroying means operative and inoperative; and means sensing the presence of a plant in the row and connected to activate said operating means to render said plant destroying means inoperative for a time period sufficient to spare said plant; means operable independently of said sensing means to then reactivate said plant destroying means for a time period dependent on the speed of travel of the frame means along the row to destroy plants for said predesignated distance ahead of said plant.

10. The combination defined in claim 8 in which said sensing means includes electric eye elements; and ground engaging means carrying said electric eye elements mounted on said frame means for vertical and lateral movement according to the contour of the ground encountered.

11. The combination defined in claim 9 in which said means operable independently of said sensing means includes cam means with timing lands thereon connected to move according to the ground speed of said frame means.

12. Apparatus for treating growing plants planted in rows and comprising: frame means adapted to be moved longitudinally in a path along a row; plant treating means thereon; operating means for rendering said plant treating means operative and inoperative; a transversely spaced apart lamp and photocell carried by said frame means along opposite sides of the row forwardly of the plant treating means to sense the presence of a plant in the row; sled means having spaced apart shoes for engaging the ground on opposite sides of the row carrying said lamp and photocell; and means universally connecting said sled means to said frame means.

13. Apparatus for thinning growing plants planted in a row less than a predesignated distance apart comprising: frame means adapted to be moved longitudinally in a path along a row; cutter means thereon; power means for raising said cutter means from a lowered position in which it destroys the plant to a raised position in which it does not; sensing means connected to said power means and normally operative to maintain said cutter means in lowered position operative when a plant is sensed to raise said cutter means; circuit means connecting said power means and sensing means; means gauged according to the normal speed of the cutter means along the row operative in response to said cutter means reaching raised position to hold said cutter means in raised position for a time interval sufficient for the cutter means to pass over and spare the plant; means for then operating said power means to restore the cutter means to lowered position; and means connected in said circuit means to open the said circuit means connecting the power means and sensing means and prevent the sensing means from raising the cutter means for a predetermined time gauged according to the normal speed of travel of the cutter means.

References Cited

UNITED STATES PATENTS

| 2,177,803 | 10/1939 | Ferte et al. | 172—6 |
| 2,455,148 | 11/1930 | Traver | 172—68 |
| 2,507,001 | 5/1950 | Ferte | 172—6 |
| 2,592,689 | 6/1952 | Hann | 172—6 |
| 2,681,606 | 6/1954 | Richey | 172—6 X |
| 2,682,132 | 6/1954 | Marihart | 47—1 |
| 2,804,004 | 8/1957 | Hubalek et al. | 172—6 |

ABRAHAM G. STONE, *Primary Examiner.*

J. R. OAKS, *Assistant Examiner.*

U.S. Cl. X.R.

172—6